Feb. 17, 1948.                C. P. CUENI                2,435,998
COMPOSITE PRESTRESSED CONCRETE BEAM AND SLAB STRUCTURE
Filed March 31, 1943        4 Sheets-Sheet 3

INVENTOR.
Clement Paul Cueni

Feb. 17, 1948. C. P. CUENI 2,435,998
COMPOSITE PRESTRESSED CONCRETE BEAM AND SLAB STRUCTURE
Filed March 31, 1943 4 Sheets-Sheet 4

INVENTOR.
Clement Paul Cueni
BY

Patented Feb. 17, 1948

2,435,998

UNITED STATES PATENT OFFICE 2,435,998

COMPOSITE PRESTRESSED CONCRETE BEAM AND SLAB STRUCTURE

Clement Paul Cueni, Arlington, N. J., assignor to Porete Mfg. Company, North Arlington, N. J., a corporation of New Jersey Application March 31, 1943, Serial No. 481,361

15 Claims. (Cl. 72—61)

The present invention is directed to composite construction consisting essentially of a precast, prestressed reinforced concrete beam and a poured in place reinforced concrete slab, the two elements connected together by an effective and reliable shear reinforcement so as to form one statical unit. The subject of the present invention, therefore, is a novel type of prestressed reinforced concrete and composite construction.

Prestressed reinforced concrete had previously been proposed and some use thereof has been made in structures. However, it has been subject to numerous disadvantages. For instance, it has been customary to apply such prestressing in the field, but the prestressing of the reinforcing bars has required such a large force that it was difficult to provide the necessary machinery and the auxiliary equipment together with the skilled labor, to allow it to be economically applied. It has also been practically impossible to obtain uniform results in the field because of the practical impossibility of obtaining uniform and reproducible conditions of operation.

Such prestressed concrete units have also been made in the factory, where it is convenient to apply the prestressing to the reinforcing bars. However, such structures require that each element or unit be produced independently of the other and, as a result no cooperation between the various units has been obtained. Therefore, the full advantages which might result from such prestressed construction has heretofore not been obtainable.

Another construction which had previously been used embodied a steel beam which was connected to a concrete slab by suitable shear reinforcements so that the parts did act as a single unit, the steel sustaining the tensile stresses and the concrete sustaining the compressive stresses. Such a construction was quite costly, in that a relatively large amount of steel was required therein. The amount of steel was such that it very substantially increased the cost of construction. Furthermore, because the steel beam was exposed, it was necessary in many structures to fire-proof the same, and this required an additional and substantial expense.

A considerable amount of steel might be saved if high carbon steel with a yield point of 3 to 5 times that of the ordinary reinforcing steel could be used in reinforced concrete construction. However, this is not ordinarily possible because the high tensile steel has the same modulus of elasticity and, therefore, would elongate 3 to 5 times as much as usual reinforcing steel before reaching its yield point. The resulting deflection would be excessive, and the concrete would be crushed long before the ultimate strength of the steel could be developed. Excessive cracks in the concrete would occur on the tension side of the beam, thereby destroying the bond of the concrete to the reinforcement, and thus making the combination of steel and concrete ineffective.

By prestressing the high tensile steel reinforcement up to 70% of its strength before the concrete is poured, and releasing the prestressing force after the concrete has set, such compressive stresses will be introduced into the concrete, that it can be stressed in tension as well as in compression without developing cracks, and the full strength of the reinforcement is developed. Besides saving a considerable amount of steel such a prestressed concrete construction has many technical advantages.

The present invention is intended and adapted to overcome the disadvantages and difficulties inherent in prior structures of the types discussed above, and to provide a composite structure in which a part thereof may be produced in a factory and the remainder in the field, to give a unitary and cooperative effect.

It is also among the objects of the present invention to provide a reinforced concrete composite structure in which some of the elements are prestressed and others are not prestressed and said elements are caused to act as a single statical unit.

It is also among the objects of the present invention to provide a composite structure which has a substantially greater strength than the component elements thereof, which shows a high resistance to bending moments, and which develops a relatively low stress at design loads.

According to the present invention a prestressed reinforced concrete beam, that is precast in a plant, where no difficulties are encountered in prestressing the reinforcing bars, is reliably and effectively connected to a poured in place concrete slab in such a way that both elements act as one statical, monolithic unit. The poured in place concrete slab sustains the compressive stresses and the precast beam is prestressed in such a way that no tensile cracks occur when it sustains the tensile stresses. Thus all the advantages of poured-in-place prestressed concrete are achieved.

Tensile and shrinkage cracks in the concrete are eliminated, and development of the full strength of high tensile steel reinforcement is obtained. And this is effected without the costly and complicated prestressing in the field of the reinforcing bars. The erection is simpler and speedier, no formwork for the beams and no or much less falsework is required and, therefore, considerable time and cost saved. Uniform, high strength concrete, which is essential for prestressed concrete construction, can best be made in a plant where the conditions for an accurate, uniform mixture are much more favorable than in the field. If the concrete used is not of high quality many of the advantages of prestressed concrete cannot be attained, and the bond strength may be too low to develop the full strength inherent in the high tensile steel reinforcement.

A prestressed concrete beam composite structure has great advantages compared with all heretofore known constructions used in floors for buildings and bridges. It requires 85% to 95% less steel than a plain steel beam construction, has considerably less deflection under load, provides more lateral stiffness and forms a homogeneous floor system, more adapt to sustain impact. It requires 70% to 80% less steel than a steel beam composite construction and provides the same rigidity. It requires 65% to 75% less steel than a reinforced concrete T beam construction, which has 50% more dead load, and produces tensile cracks. For long spans the heavy dead load of a reinforced concrete beam is a big disadvantage.

It requires less tensile steel than a poured in place prestressed T beam section and has lower stresses in the concrete at the design load. The concrete required for the poured-in-the-field slab of the composite section is of normal quality, and does not require more care than any reinforced concrete work.

Compared with a precast prestressed concrete beam, not used together with the poured-in-place concrete slab to form a composite section, the advantages of the section according to the present invention are extensive. Less compression area is required because the compressive stresses are sustained by the poured-in-place concrete slab, and since the lever arm for the steel is increased much less steel is required for the same bending moment. The resisting moment of a plain prestressed beam is increased by 80% to 120% if a composite section is formed with the poured-in-place concrete slab. Used as a composite section the prestressed concrete beam does not require such high quality concrete as does a single prestressed beam. This is an advantage, for the manufacture of a concrete with an ultimate strength of 8,000 pounds per square inch or more is not yet a simple proposition.

A prestressed beam required for a composite section is much lighter than the equivalent plain prestressed beam, and, therefore, there is a saving in cost of handling, shipping and erection.

A structure according to the present invention is not merely a combination of prestressed reinforced concrete and composite construction, as it seems to be, but a new structure with properties heretofore thought impossible to achieve in reinforced concrete or steel construction.

In the diagram of the stresses at the design load, and in the procedure and the formulas of the design are two clear indications that the structural unit according to the present invention is something new and quite different from anything heretofore known in the art.

A diagram of the stresses in a concrete beam, after the design load is applied, that shows no tensile stresses in the tension part of the concrete, and only small compressive stresses in the compression side, is indeed unusual. Yet, all materials are as fully utilized as in any other type of construction. A reinforced concrete T beam has some similarity in the compression in the concrete on the compression side, but has tensile stresses on the tension side, up to the neutral axis, most always even tension cracks in the concrete. A prestressed reinforced concrete section has some similarity on the tension side, but the compressive stresses increase from the bottom of the section toward the top to reach a compression of high magnitude at the extreme fiber of the compression side. The stress diagram at the design load of any section, steel or concrete or reinforced concrete, or any composite section, looks quite different from the stress diagram of a prestressed beam composite section.

The same is true of the design of such a section. It is different from that of a single prestressed beam and also different from that of a steel beam composite section. It is similar to the design of a reinforced concrete T beam section but only so for the ultimate load, whereas the design for working stress is entirely different. As long as the prestressed beam is under compression, it will act in a similar way as a steel beam, namely, it can sustain tensile stresses. Since the design is made under the assumption that, at the design load, no tensile stresses shall occur at the bottom of the precast beam, the computation of the section for the design load is similar to that of a steel beam composite section.

If more than the design load is applied, the compressive stresses in the bottom of the concrete will gradually change to tensile stresses and finally, when the tensile strength of the concrete is reached, the concrete will crack. From then on the section will act like a reinforced concrete T-beam and has to be designed as such.

If the precast prestressed beam is erected without temporary intermediate supports, and, therefore, has to carry the dead load alone, without benefit from the composite section of the slab, three steps are required in computing the stresses of such a beam.

a. For the computation of the stresses in the prestressed beam due to the dead load: It is assumed that the precast beam is acting like any prestressed reinforced concrete beam.

b. For the computation of the stresses in the composite section due to the live load: It is assumed that the composite section acts in a similar way as a steel beam composite section, the poured-in-place concrete slab sustaining the compressive stresses, and the prestressed concrete of the precast beam sustaining the tensile stresses.

c. For the computation of the ultimate load: It is assumed that the composite section acts like a reinforced concrete T-beam section, the poured-in-the-field concrete slab sustaining the compressive stresses and the bottom steel of the precast beam, the tensile stresses.

All prestressed beam composite sections have to be checked for ultimate load, for the assumption of a certain working stress for the steel does not always mean a corresponding factor of safety as it does in other types of construction.

Such a design is very unusual and together with the different stress diagram proves the novelty of the construction that is the object of the present invention.

To force the precast prestressed beam to act together with the poured-in-place concrete slab, an effective shear connector is required and the problems involved in designing such a connector are quite different from those in designing a connector for a composite section that uses a steel beam for the tension member. Any shear reinforcement can effectively be connected to a steel beam in a simple and economical way, for instance, by welding. With a prestressed concrete beam this is not so. Stiff shear reinforcements such as I-beam or T-beam sections, which, welded to a steel beam form an effective shear reinforcement, cannot be used for several reasons, unless they are effectively connected to an anchoring bar embedded in the precast beam.

Stirrups, sticking out of the precast beam and reaching into the concrete slab, may be effective for small shear per unit length but are too complicated and not effective for heavy shear, for the transmission of the shear into the concrete slab is too concentrated and not uniform. Besides, the stirrups may be bent in handling and erecting the beams, and, therefore, not reach as well into the concrete slab, as assumed in the design. Spiral or sinuous shaped rods have proved to be very effective shear reinforcements if welded to steel beams. If they can be effectively connected to the precast prestressed beam they will satisfy all requirements. Simply embedding the spirals or bent bars in the precast beam will not be sufficient in most cases.

According to the present invention the spiral or sinuous shaped shear reinforcement may be connected to the precast prestressed beam in the following way, for example:

The rod or bar is embedded in the top of the precast beam, and is connected by welding to a longitudinal bar which is entirely embedded in the precast beam. The beam is prestressed in such a way that this bar and the concrete in top of the beam will be under compression at any stage of loading. This is quite important, because if the top of the precast beam is stressed in tension, as it will be in any composite section where the neutral axis falls outside the beam, the anchoring of the shear reinforcement will not be effective.

Another way to effectively connect the shear reinforcement to the precast beam, according to the present invention, is to weld a spiral on both sides of a longitudinal bar, embed one of them in the precast beam and the other in the poured-in-place concrete.

In still another construction those reinforcing bars of the poured-in-place slab that run perpendicular to the beam may be prestressed and the prestress force released after the concrete has set. The concrete of the slab placed under high pressure will press against the top flange of the precast beam and prevent any relative movement of concrete slab and precast beam. Since this prestress can be predetermined at will and the beam more or less embedded in the poured-in-place slab to adjust the pressure area to the need, this novel type of shear connection can be used alone without any other shear reinforcement, or it can be used in conjunction with shear connectors, such as the spiral, to increase their efficiency.

A horizontal shear of 4,000 pounds per lineal inch is quite considerable, even for heavy construction. Assuming the beam is embedded 1.25" in the concrete slab, a prestress of 1200 pounds per square inch will be enough to take care of the total shear. This prestressing of the poured-in-place concrete slab will make it possible to safely use less effective shear connectors, like stirrups or to use lighter connectors.

A prestressed beam composite section according to the present invention can well be designed and erected as continuous over several spaced supports, though the precast beams are spliced over the supports. Such a beam has great advantages, with respect to economy and stiffness, as compared with a simple span prestressed beam composite section.

Prestressed concrete beams may be used for continuous spans. Either they are poured in the field with all the difficulties involved or they may be precast, with top and bottom flange cross-section similar and with the same prestressing to take care of positive and negative moment. This is a great disadvantage, because at the place of the positive moment the compression in the concrete due to prestressing will add to the compression due to the bending moment. This means very high concrete stresses and requires a high strength concrete, not yet easy to manufacture in a plant and almost impossible to achieve in the field. Besides, a precast beam would have to be made in the full length of the continuous spans, because splicing is not possible. With precast beam composite construction both disadvantages are eliminated.

At the negative moment over the supports, steel bars are placed into the poured-in-place concrete slab to sustain the tensile stresses. The compressive stresses in the bottom of the beam have to be sustained by the concrete. This presents a problem, because the beam has insufficient cross-sectional area and the concrete is already under compression, due to the prestressing. To overcome this difficulty, according to the present invention the precast beam is thickened at the ends, whereby the unit prestress is considerably reduced and the compression area increased. The continuous connection of the compression part of two beams may be effected by poured-in-place concrete, which may form at the same time a support diaphragm or may be part of the pier.

In the accompanying drawings constituting a part hereof and in which like reference characters indicate like parts.

Figure 1:
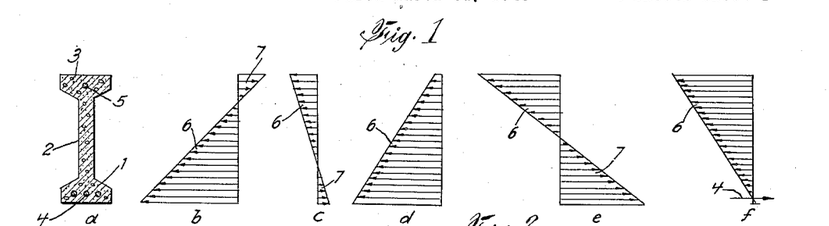
Fig. 1 is a diagrammatic view showing a prestressed reinforced concrete beam and the stress diagrams thereof.

In Fig. 1a the beam comprises a bottom flange 1, that must be ample to cover well the numerous steel wires that are required to prestress the concrete. The concrete area of the web 2 is comparatively thin because prestressed concrete, due to higher strength of the concrete and the web reinforcement, and due to the prestressing can sustain high unit shear. Top flange 3 is comparatively heavy because enough area has to be provided to sustain the compressive stresses of the beam. The high strength tensile wires 4 may be prestressed up to 80% of the yield point, and kept prestressed during the pouring and setting of the concrete. Once the concrete has sufficient strength to sustain the prestressing, the prestressing force is released and the steel wires, having the tendency to go back to their original length, will introduce compressive stresses into the concrete which thereby is made capable of sustaining high tensile stresses without developing cracks. Top reinforcement 5 may consist of high tensile steel wires, prestressed or not prestressed, or may consist of ordinary reinforcing bars, not prestressed. The top reinforcement is required to prevent the top of the beam from cracking.

Diagram b shows the stresses produced in the concrete by releasing the highly prestressed bottom wires. In the bottom part of the beam considerable compressive stresses, shown by the arrows 6, are produced which, due to eccentricity, decrease toward the top to become tensile stresses at the upper part of the beam, as shown by arrows 7. At c is shown the stresses produced by the release of the prestressed top wires. The arrows 6 represent the compressive stresses, which are at the upper part of the beam, and 7 represents the tensile stresses which are at the lower part. Diagram d indicates the prestresses in the concrete due to top and bottom wires together. The whole concrete area of the beam is under compression as is indicated by the arrows 6. Diagram e illustrates the stresses produced in the concrete by the applied load (dead load plus live load). In the bottom it is tension, indicated by arrows 7, and in the top it is compression, indicated by arrows 6.

The stress diagrams d and e superimposed give stress diagram f, which shows the stress in the concrete of the prestressed beam at the design load. There is a considerable compressive stress in the upper part of the beam, as indicated by arrows 6, and no stress at all in the bottom, or only a small tensile stress or small compressive stress, whichever is desired. This is the outstanding feature of prestressed reinforced concrete, no stresses, or only negligible ones, in the bottom of the beam or slab, after the design load has been applied.

Figure 2:
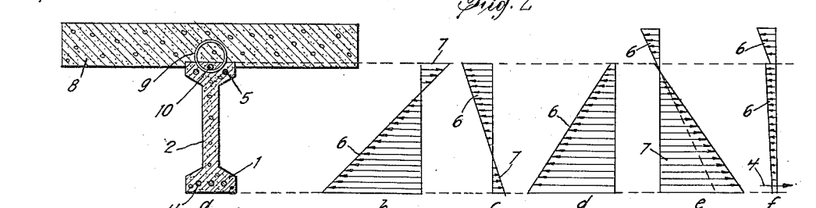
Fig. 2 is a view similar to Fig. 1, but showing a composite structure including the same beam as shown in Fig. 1.

Fig. 2a is a cross-section of a beam similar to the one shown in Fig. 1a, but combined with a poured-in-place concrete slab, to form a composite section. The concrete area of the top flange need not be so great, since most of the compressive stresses will be sustained by the poured-in-place concrete slab 8. If the composite section is designed to resist the same bending moment as the beam of Fig. 1a, the required steel area would be about half thereof. If the steel area is the same, the composite section will sustain a bending moment twice as great. The latter was assumed in the stress diagrams. In many cases, the prestressed wires or rods 5 in the top can be omitted and be replaced by an ordinary reinforcing bar 10 which also serves to anchor the spiral in the top flange of the prestressed concrete beam. Spiral or sinuous shear connector or reinforcement 9 is designed to transmit the horizontal shear between the precast beam and the poured-in-place concrete slab. The spiral 9 is welded to longitudinal anchoring bar 10. The stress diagrams 2b, 2c and 2d are exactly the same as 1b, 1c and 1d. Both beams are identical and have the same prestresses until they are erected and the load is applied.

Beam 1a has to sustain the total bending moment, as shown by stress diagram 1e. The same prestressed beam in Fig. 2a, acting together with the poured-in-place concrete slab, sustains only the tensile stresses 7, the compressive stresses 6 being sustained by the concrete slab. Since the neutral axis is located much higher than in the simple beam, the tensile stresses are about the same despite twice as great a bending moment. In a case as here assumed, where temporary supports are used during pouring and setting of the concrete, there are almost no compressive stresses produced in the prestressed beam, since most of the compressive stresses are sustained by the poured-in-place concrete, as indicated by arrows 6.

Fig. 2f shows the diagram of the concrete stresses of the composite section at the design load. The whole concrete section is under compression as indicated by arrows 6. It is remarkable that there are no tensile stresses at the design load, as shown by stress diagrams 1f and 2f, and even more remarkable that there are only very small compressive stresses in diagram 2f, as compared with diagram 1f, and this despite the fact that the bending moment applied to the composite section is twice as great as the bending moment applied to beam 1. This small stress throughout the whole section is an advantage, especially so with respect to dynamic loading.

Figure 3:
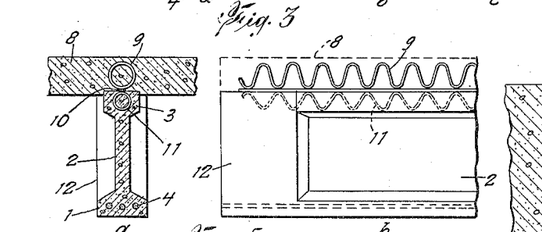
Fig. 3 shows a cross-sectional view and a side view of a composite structure made in accordance with the present invention.
Figure 4:
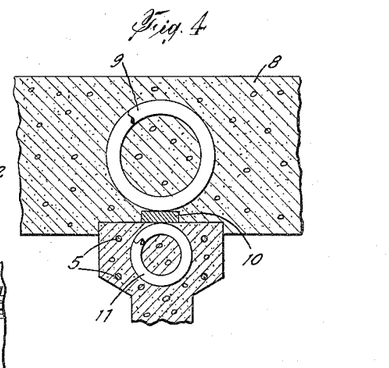
Fig. 4 is an enlarged fragmentary view of the structure shown in Fig. 3 to more clearly illustrate some details thereof.

In the composite beam structure shown in Fig. 3, the area of the top flange is reduced as much as possible so it just covers the shear reinforcement. No large area is required for the compression, because the poured-in-place concrete slab takes care of most compression. Anchoring bar 10 connects spiral 9 to spiral 11, the latter being embedded in the precast beam. Spiral 9, anchoring bar 10 and spiral 11 are welded together and placed as one unit into the form before the concrete is poured. 12 shows the web of the beam at the point of support, increased in thickness to take care of the shear. No high tensile steel reinforcement need be used in top of the beam, anchor bar 10 having enough area to take care of the possible tensile stresses. However, bars 5, 10 which are prestressed, may be used as shown in Fig. 4.

Figure 5:
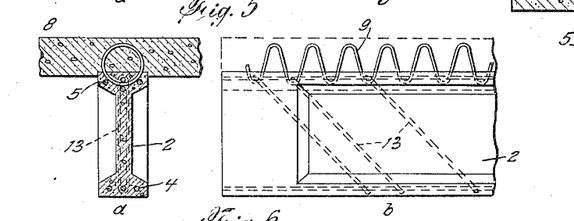
Fig. 5 is a view similar to Fig. 3 showing a modified form of the invention.

In the embodiment of Fig. 5, the spiral 9 is embedded in the precast beam and also in the poured-in-place concrete slab; therefore, no spiral 11 is required. However, prestressed top reinforcement 5 is required to produce compression stresses in the top of the beam to anchor the spiral well into the precast beam. To make the anchoring still more effective, inclined stirrups 13 are placed around the bottom reinforcement and around the spiral 9 and bar 10. These stirrups 13 also serve as web shear reinforcements.

Figure 6:
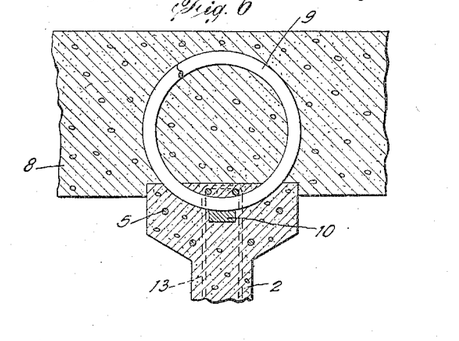
Fig. 6 is an enlarged fragmentary view showing a modification of the structure of Fig. 5.

The fragmentary view of Fig. 6 shows a modification of the structure of Fig. 5. Anchoring bar 10 is fully embedded in beam 2 and the spiral 9 is welded to the top thereof. The concrete is cast about the welded junction to such an extent that the lower part of spiral 9 is also embedded therein.

Figure 7:
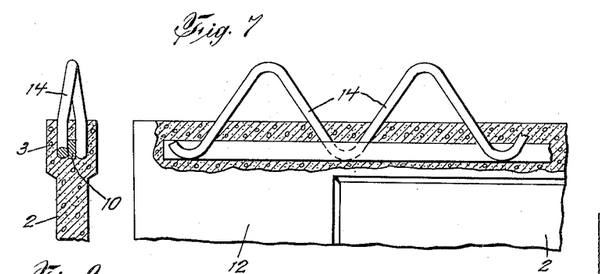
Fig. 7 is a view showing a fragmentary cross-section and a side elevation of a modified form of construction using a sinuous shear reinforcement.

In Fig. 7, there is provided anchoring bar 10, which is welded to bar 14, which is bent into the shape of a waved line and is embedded in the precast beam and will be embedded in the poured-in-the-field concrete slab. The alternate nodes of shear member 14 are welded to alternate sides of bar 10.

Figure 8:
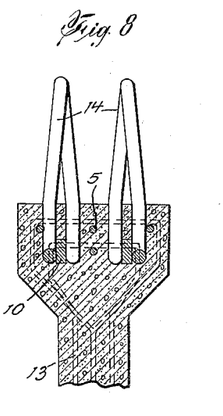
Fig. 8 is an enlarged fragmentary cross-sectional view of a beam having shear reinforcements of a modified character integrally formed therewith.

Fig. 8 shows a shear connector similar to that shown in Fig. 7, but one that is able to transmit much heavier shear. There are provided two anchoring bars 10 and two shear connectors 14 consisting of bars, wave-like in shape, and welded alternately on the left and right side to each of the anchor bars 10, and embedded in the precast beam and the poured-in-place concrete slab. Stirrups 13 are used to anchor the shear connectors more effectively to the precast beam, and also as shear reinforcement of the web.

Figure 9:
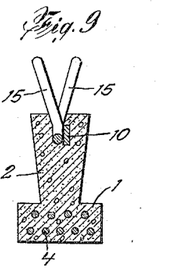
Fig. 9 is a vertical cross-sectional view of a modified form of precast, prestressed beam particularly adapted for light construction.

Fig. 9 is a cross-section of a precast beam suitable for light construction. A shear connector 15 is welded to anchor bar 10. It consists of a bar of wave-like shape welded always on the same side at touching points to the anchor bar. The loops of the shear bar are bent alternately in opposite directions to distribute the shear in the concrete over a wider area.

Figure 10:
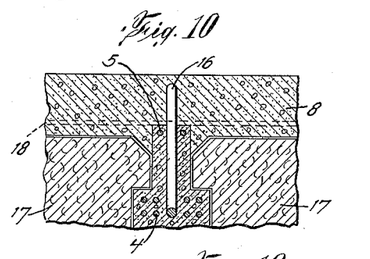
Fig. 10 is a fragmentary cross-sectional view of a composite structure embodying a beam similar to that of Fig. 9 but utilizing a different form of shear reinforcement.

Fig. 10 shows a cross-section of a precast beam similar to the one shown in Fig. 9. Both of these beams have a suitable shape to support a filler block, which at the same time serves as an insulation and replaces the formwork. It makes an economical floor construction suitable for institutional buildings and apartment houses. Shear bar 16 consists of a bar bent into wave-like shape, and is embedded in the precast slab, extending out of the top thereof to be embedded in the poured-in-the-field concrete slab. Filler block 17 serves as an insulation and the formwork. It is placed between two adjacent beams and makes possible a simple and speedy erection. 18 represents the reinforcement of the poured-in-the-field concrete slab.

Figure 11:
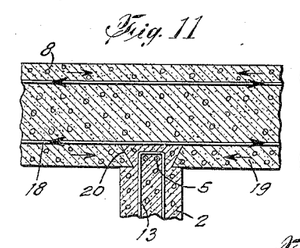
Fig. 11 is a vertical cross-sectional view of a modified form of composite structure in which the slab element is prestressed.

In Fig. 11, 2 is the upper part of the web of a precast beam that has no top flange. 5 is the top reinforcement and 6 is the poured-in-place concrete slab, 13 represents the stirrups in the beam and 18 represents the reinforcing bars of the slab that run perpendicular to the longitudinal axis of the beam. If these reinforcing bars consist of high tensile steel wires and are prestressed, they will introduce compressive stresses into the concrete slab, perpendicular to the side faces of the beam, as indicated by arrows 19, and produce considerable pressure of the concrete against the precast beam, and thus prevent any slip. To increase the effectiveness of the connection and especially to prevent uplift of the slab, the top of the beam may form a dovetail, as indicated at 20.

Figure 12:
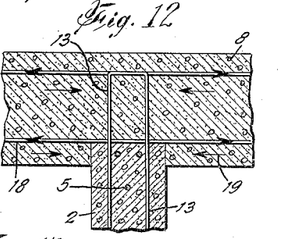
Fig. 12 is a view of a modification similar to Fig. 11.

Fig. 12 is similar to Fig. 11, the difference being the omission of the dove-tail top of the precast beam, and the use of the stirrups 13 instead to prevent uplift of the slab. The stirrups of the beam stick out and reach into the poured-in-the-field concrete slab. Any shear reinforcement may be used in conjunction with the prestressing of the slab to effect a reliable connection of precast beam and concrete slab.

Figure 13:
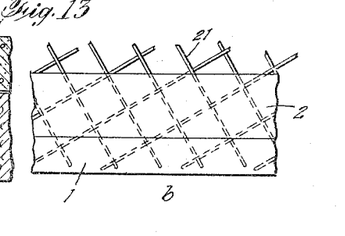
Fig. 13 is a fragmentary cross-sectional view and a side elevational view of a structure similar to Fig. 10 but having a wire mesh shear reinforcement.

In the embodiment shown in Fig. 13, which is similar to Fig. 10, no top flange is necessary. There is provided a shear reinforcement 21 for the web, consisting of welded wire mesh, or expanded metal. At the same time, it connects effectively the precast beam to the poured-in-the-field concrete slab. To anchor the wire mesh more effectively in the slab or the beam, some or all of the wires may be bent as indicated by 22. One wire may be heavier than the other and the heavier one may be perpendicular to the longitudinal axis of the beam, or inclined toward the support of the beam as shown in Fig. 13b.

Figure 14:
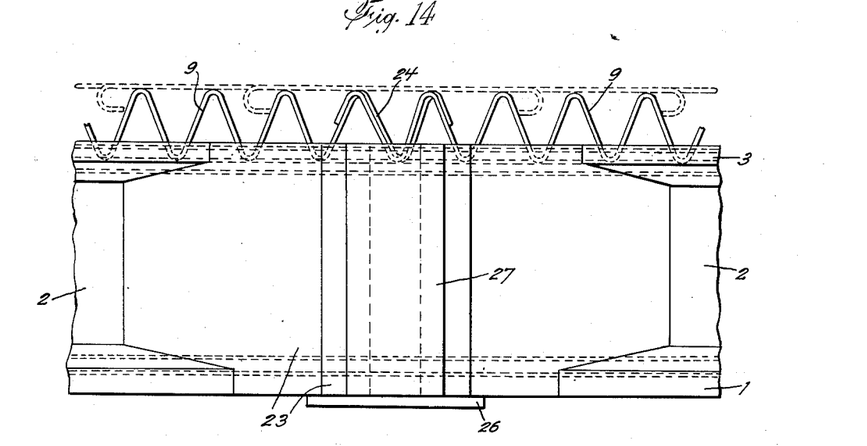
Fig. 14 is a side elevational view of a structure embodying at least two prestressed concrete beams interlinked in such a manner as to form a continuous beam structure.
Figure 15:
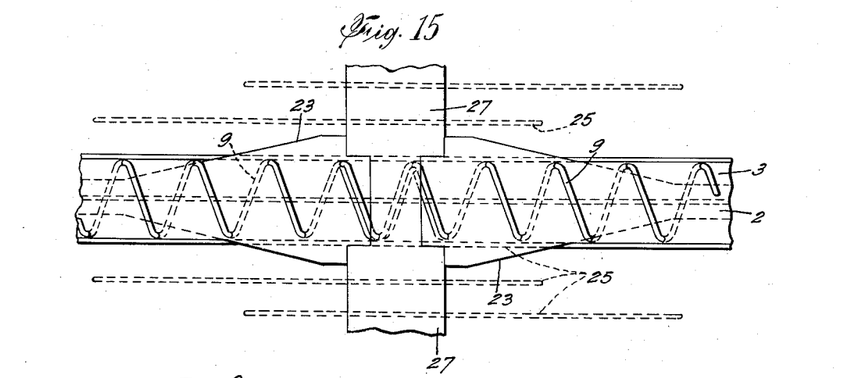
Fig. 15 is a top plan view thereof.
Figure 16:
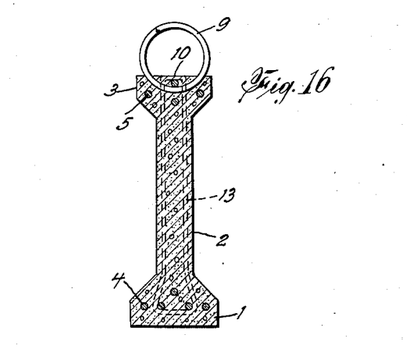
Fig. 16 is a vertical cross-sectional view thereof.

In Figs. 14, 15 and 16 there is illustrated a prestressed beam used for continuous construction over a series of several supports, only one of which is shown. The spirals 9 of the two precast beams, which are placed end to end over a support, overlap at 24. The web 2 and the flanges 1 and 3 are widened at 23 to take care of the increased shear stresses and the compression at the bottom of the beams, due to the negative moment. Tensile reinforcements 25 of the negative moment are placed in the top of the poured-in-place concrete slab. 26 is a bearing plate for the support (not shown). 27 represents the reinforced concrete support diaphragm, poured in place to make possible the transmission of the compressive stresses between two adjacent beams. To make a continuous beam design economical, three or more spans are provided. In such a structure, the stresses over an interior support are opposite to those in a single span beam. Compression is at the bottom and tension at the top.

Figures 17, 18:
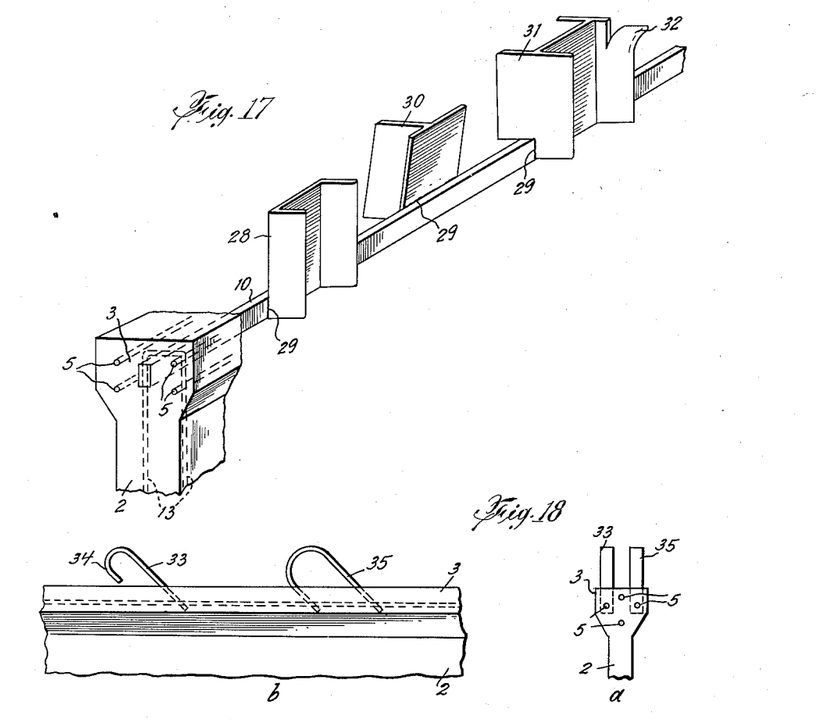
Fig. 17 is a perspective view of a portion of a beam, some parts being broken away for clearness.
Figs. 18, 19 and 20 each shows a side and an end elevation of the upper part of prestressed beams of modified constructions.

In Fig. 17, anchoring bar 10 is of considerable stiffness, and preferably is a flat bar placed upright in the concrete in the flange 3 of the beam. Shear connector 28, in the shape of a channel, is well connected to anchor bar 10, preferably by welding along three sides, as shown by 29. To resist the uplifting of the slab, shear connector 30, which is in the shape of a T section, is inclined toward the center of the beam. Connector 31, in the shape of an I beam, has part of one flange cut and bent, as shown by 32, to resist the vertical component of the horizontal shear. Such stiff shear connectors if well connected to a rigid anchoring bar, which is well embedded in the prestressed beam, and preferably anchored to it by stirrups, may be of advantage for heavy construction. The transmission of the horizontal shear is effected through compression of the flat surfaces (perpendicular to the axis of the beam) of the shear connectors against the poured-in-the-field concrete.

As shown in Fig. 18, shear connector 33 is a flat bar with an end hook 34, for better anchoring in the poured-in-the-field concrete slab. One or more of the top reinforcing bars pass through a hole in the connector, thereby anchoring it well to the precast beam. Shear connector 35 is similar, only the wires 5 pass through both ends of the bar, which forms one large hook. These shear connectors may be single, alternating along the sides of the beam, or they may be arranged in pairs.

Figure 19:
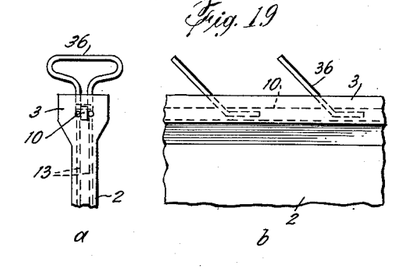
Figure 20:
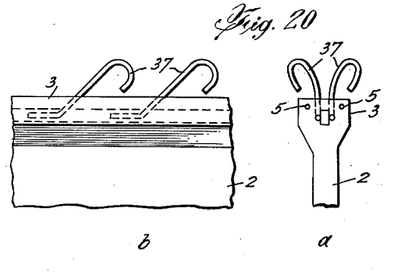

Fig. 19 shows another connector 36 in the form of a hooked bar, both ends of which are welded to anchoring bar 10. The hooks are inclined in the direction of the horizontal shear, as shown in Fig. 19b. Fig. 20 shows a shear connector 37, similar to 33, consisting of single hooks welded to anchoring bar 10. These hooks may be used in pairs or alternately welded to the sides of the anchoring bar, and are inclined in the direction of the horizontal shear. Prestressed top wires 5 may be used to prestress the top flange of the beam.

Although I have described the invention setting forth a number of variations in the mechanical arrangement of the parts to obtain the desired results, the several modifications so set forth are not to be considered as limiting the invention. They are intended to illustrate the scope of the invention, and illustrate the fact that many embodiments are possible. Therefore, the invention is to be broadly construed and not to be limited, except by the character of the claims appended hereto.

What is claimed is:

1. A composite structure comprising a beam of concrete having a top flange, longitudinal reinforcing rods of steel therein, said rods being prestressed, a shear reinforcement member of steel embedded within said beam and extending above the top flange thereof, said member being in substantial contact with at least one of said rods and being gripped by concrete under compression, a concrete slab on top of said beam and united therewith through said shear member.

2. A composite structure comprising a beam of concrete having a top flange, longitudinal reinforcing rods of steel therein, said rods being prestressed, a shear reinforcement member of steel embedded within said beam and extending above the top flange thereof, said member being welded to at least one of said rods and being gripped by concrete under compression, a concrete slab on top of said beam and united therewith through said shear member.

3. A composite structure comprising a beam of concrete having a top flange, longitudinal reinforcing rods of steel therein, said rods being prestressed, a shear reinforcement member of steel fastened to a longitudinal bar and embedded within said beam and extending above the top flange thereof, said member being continuous over the length of said beam and being sinuous in form, a concrete slab on top of said beam and united therewith through said shear member.

4. A composite structure comprising a beam of concrete having top and bottom flanges, longitudinal reinforcing rods of steel therein in both the top and bottom flanges thereof, said rods being prestressed, a shear reinforcement member of steel fastened to a longitudinal bar and embedded within said beam and extending above the top flange thereof, a concrete slab on top of said beam and united therewith through said shear member.

5. A composite structure comprising a beam of concrete having a flange, longitudinal reinforcing rods of steel therein in both the top and bottom flanges thereof, said rods being prestressed, a shear reinforcement member of steel embedded within said beam and extending above the top flange thereof, reinforcing rods in the web of said beam and interconnecting the top and bottom rods, a concrete slab on top of said beam and united therewith through said shear member.

6. A composite structure comprising a beam of concrete having a top flange, longitudinal reinforcing rods of steel therein, said rods being prestressed, a shear reinforcement member of steel extending above the top flange thereof, a sinuous reinforcement within said top flange, a longitudinal bar, said shear member being united with said sinuous member through said bar, a concrete slab on top of said beam and united therewith through said shear member.

7. A composite structure comprising a beam of concrete having top and bottom flanges, longitudinal reinforcing rods of steel therein, said rods being prestressed, a shear reinforcement member of steel extending above the top flange thereof, a sinuous reinforcement within said top flange, a longitudinal bar, said shear member being united with said sinuous member through said bar, a concrete slab on top of said beam and united therewith through said shear member, the width of the upper flange of said beam being sufficient to enclose said sinuous member and being narrower than the lower flange.

8. A composite structure comprising a beam of concrete having a top flange, longitudinal reinforcing rods of steel therein, said rods being prestressed, a shear reinforcement member of steel extending above the top flange thereof, a sinuous reinforcement within said top flange, a longitudinal bar secured to the top of said sinuous member and extending above the top surface of said beam, said shear member being united with said bar, a concrete slab on top of said beam and united therewith through said shear member.

9. A composite structure comprising a beam of concrete having a top flange, longitudinal reinforcing rods of steel therein, said rods being prestressed, a pair of substantially parallel shear reinforcement members of steel embedded within said beam and extending above the top flange thereof, a concrete slab on top of said beam and united therewith through said shear members.

10. A composite structure comprising a beam of concrete having a top flange, longitudinal reinforcing rods of steel therein, said rods being prestressed, a shear reinforcement member of steel embedded within said beam and extending above the top flange thereof, said member being continuous over the length of said beam, said member being substantially flat and extending from near the bottom up through the top of said beam, a concrete slab on top of said beam and united therewith through said shear member.

11. A composite structure comprising a beam of concrete having a top flange, longitudinal reinforcing rods of steel therein, said rods being prestressed, a shear reinforcement member of steel embedded within said beam and extending above the top flange thereof, a concrete slab on top of said beam embracing a portion of the top thereof and united therewith through said shear member, reinforcing elements in said slab, said elements being prestressed, whereby compression in said slabs causes gripping of the top of said beam.

12. A composite structure comprising a beam of concrete, longitudinal reinforcing rods of steel therein, said rods being prestressed, a concrete slab on top of said beam embracing a portion of the top thereof and keyed to it, reinforcing elements in said slab, said elements being prestressed, whereby compression in said slabs causes gripping of the top of said beam.

13. A composite structure comprising a beam of concrete having a top flange, longitudinal reinforcing rods of steel therein, said rods being prestressed, a relatively stiff longitudinal bar in said beam in proximity to said rods, a plurality of shear reinforcement members secured along said bar and extending above the top flange of said beam, a concrete slab on top of said beam and united therewith through said shear members.

14. A composite structure comprising a beam of concrete having a top flange, longitudinal reinforcing rods of steel therein, said rods being prestressed, a relatively stiff longitudinal bar in said beam in proximity to said rods, a plurality of shear reinforcement members secured along said bar and extending above the top flange of said beam, a concrete slab on top of said beam and united therewith through said shear members, said members having hooked portions to provide a firm anchorage in said slab.

15. A composite structure comprising a beam of concrete having a top flange, longitudinal reinforcing rods of steel therein, said rods being prestressed, a shear reinforcement member of steel extending above the top flange thereof, a sinuous reinforcement and a longitudinal bar within said top flange, said shear member being united with said sinuous member through said bar, a concrete slab on top of said beam and united therewith through said shear member, the width of the upper flange of said beam being sufficient to enclose said sinuous member.

CLEMENT PAUL CUENI.

REFERENCES CITED

The following references are of record in the file of this patent:

UNITED STATES PATENTS

| Number | Name | Date |
|---|---|---|
| 934,378 | White | Sept. 14, 1909 |
| 938,458 | Brockhausen | Nov. 2, 1909 |
| 1,031,079 | Meier | July 2, 1912 |
| 1,597,278 | Kahn | Aug. 24, 1920 |
| 1,990,156 | Young | Feb. 5, 1935 |
| 2,016,616 | Schaub | Oct. 8, 1935 |
| 2,035,662 | Maney | Mar. 31, 1936 |
| 2,035,977 | Nichols | Mar. 31, 1936 |
| 2,058,364 | Sorensen | Oct. 20, 1936 |
| 2,137,009 | Stromberg | Nov. 15, 1938 |
| 2,303,394 | Schorer | Dec. 1, 1942 |

FOREIGN PATENTS

| Number | Country | Date |
|---|---|---|
| 449,485 | France | Feb. 27, 1913 |
| 645,008 | France | June 25, 1928 |
| 755,304 | France | Sept. 4, 1933 |